M. W. BIRD.
FRUIT GRADING MACHINE.
APPLICATION FILED AUG. 21, 1919.
1,352,780.
Patented Sept. 14, 1920.
5 SHEETS—SHEET 3.
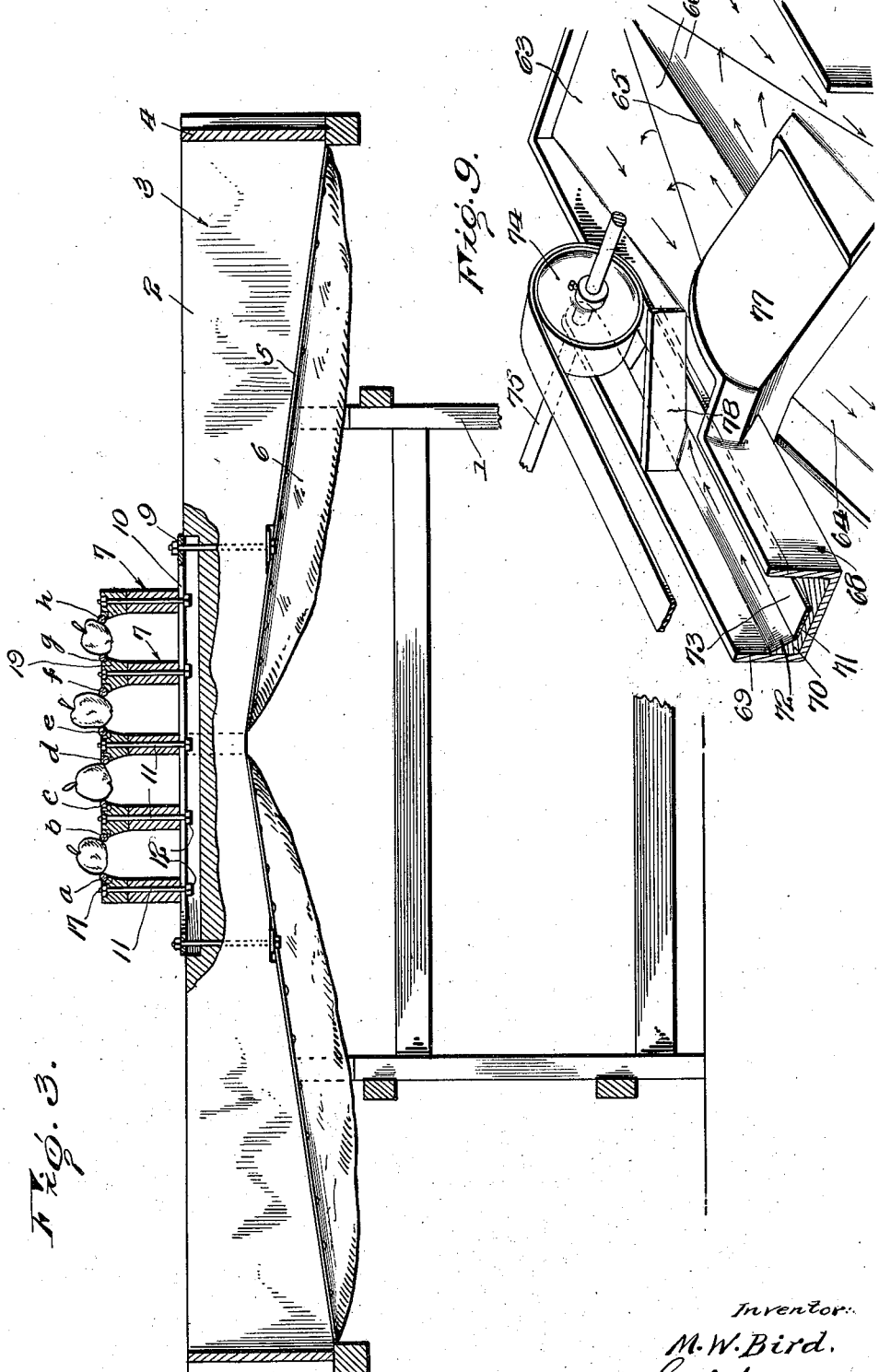

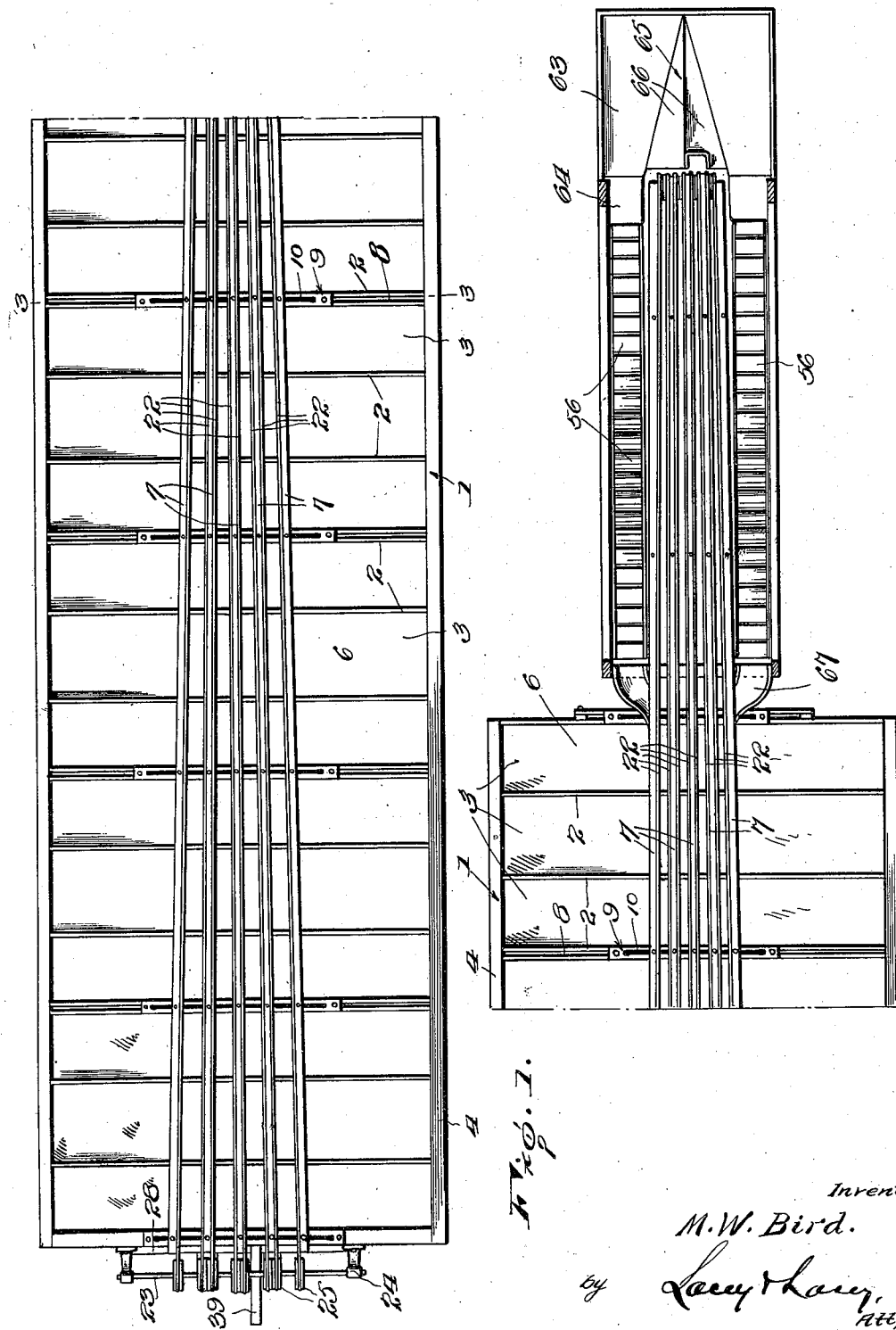

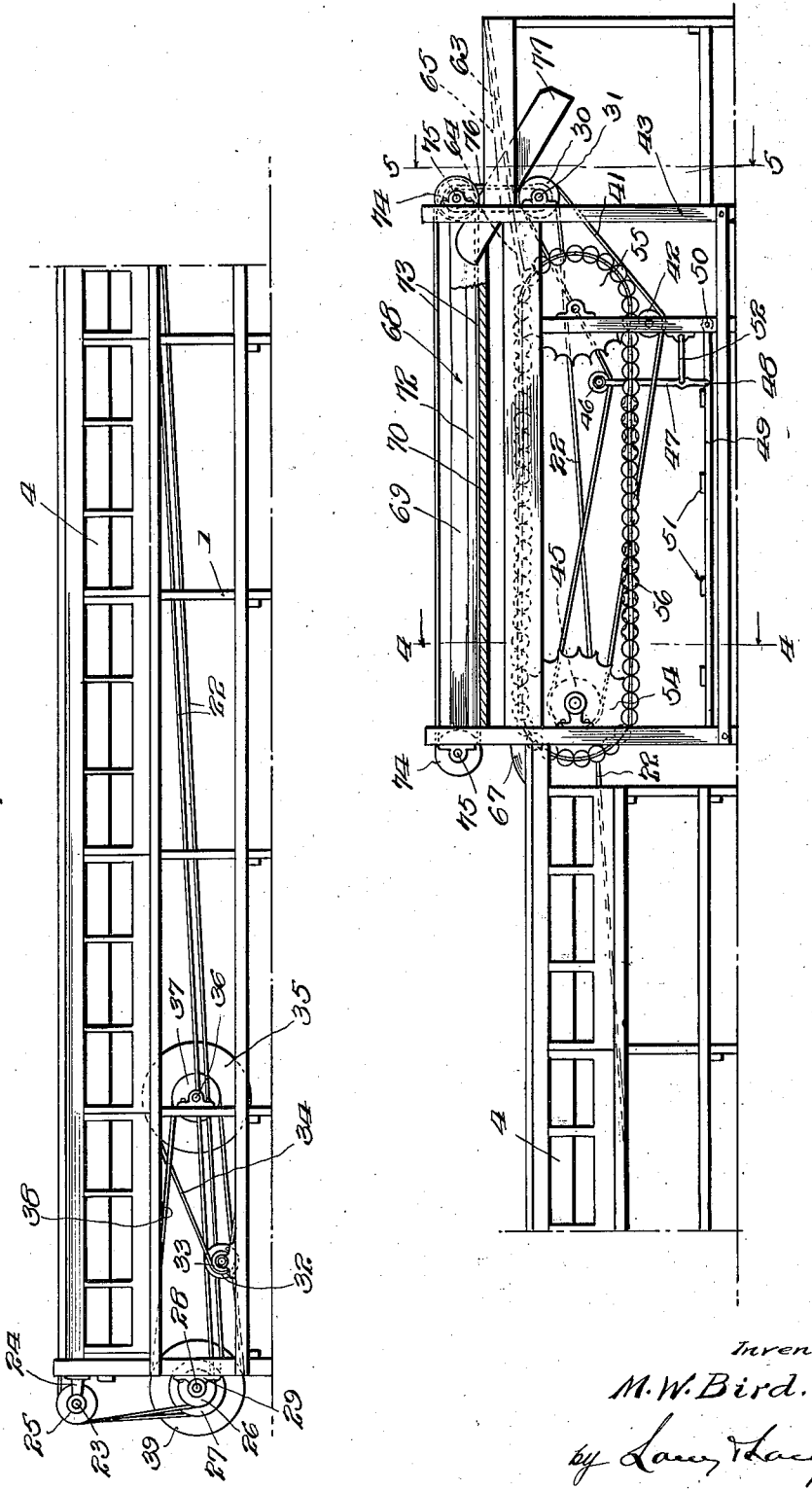

M. W. BIRD.
FRUIT GRADING MACHINE.
APPLICATION FILED AUG. 21, 1919.
1,352,780.
Patented Sept. 14, 1920.
5 SHEETS—SHEET 4.
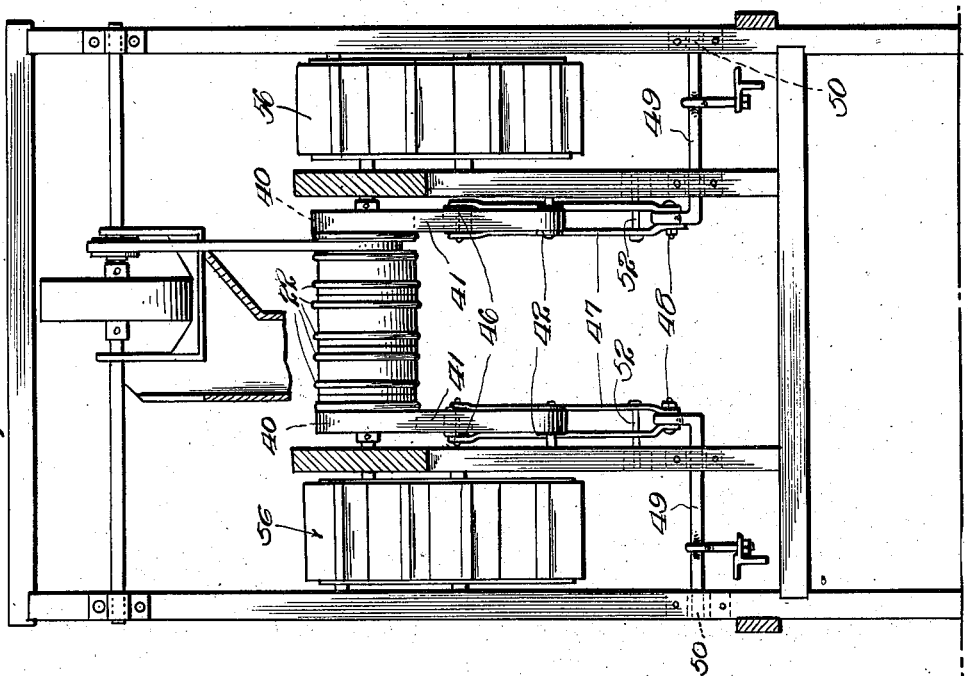
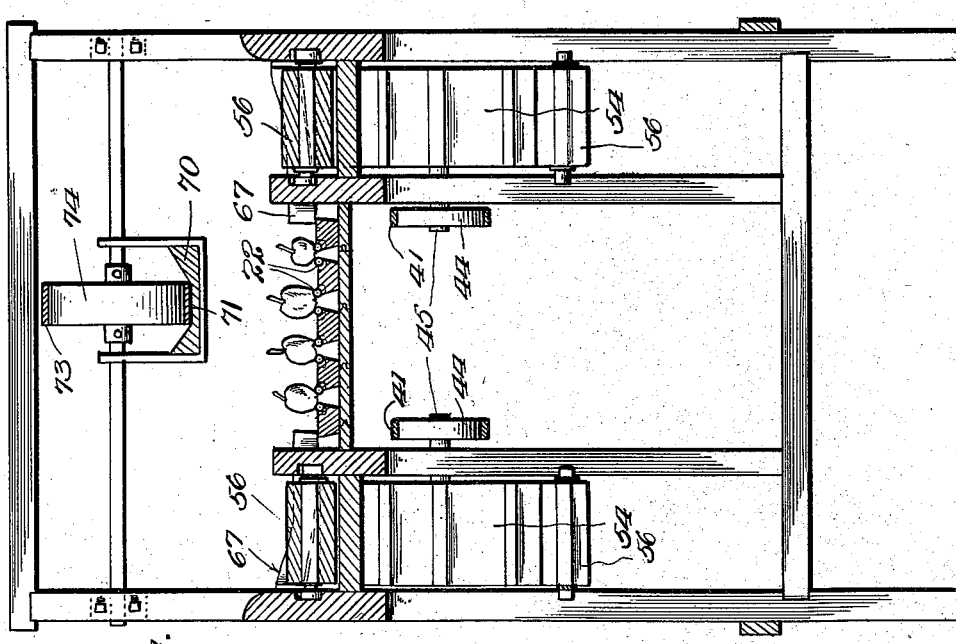
Inventor
M. W. Bird.

M. W. BIRD.
FRUIT GRADING MACHINE.
APPLICATION FILED AUG. 21, 1919.
1,352,780.
Patented Sept. 14, 1920.
5 SHEETS—SHEET 5.
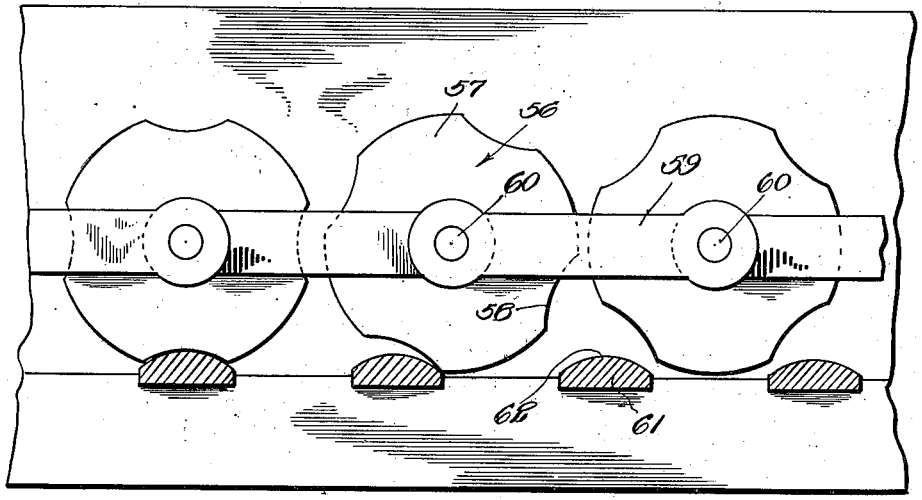
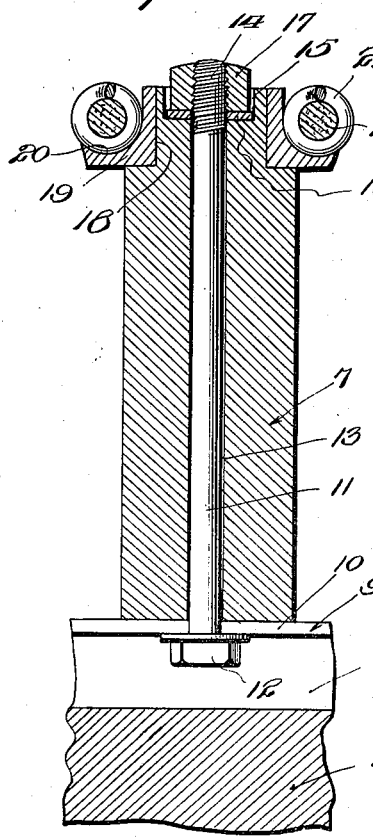
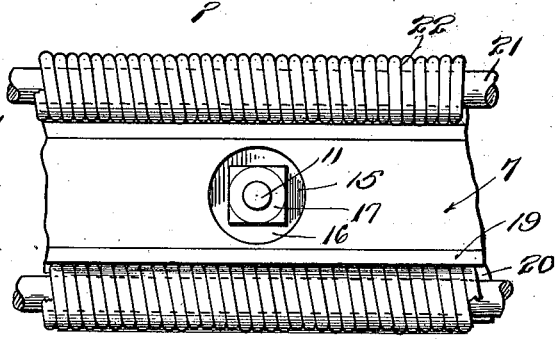
Inventor:
M. W. Bird
by Lacey & Lacey,
Attys

UNITED STATES PATENT OFFICE.

MILTON W. BIRD, OF WENATCHEE, WASHINGTON.

FRUIT-GRADING MACHINE.

1,352,780.  Specification of Letters Patent.  Patented Sept. 14, 1920.

Application filed August 21, 1919. Serial No. 318,912.

*To all whom it may concern:*

Be it known that I, MILTON W. BIRD, a citizen of the United States, residing at Wenatchee, in the county of Chelan and State of Washington, have invented certain new and useful Improvements in Fruit-Grading Machines, of which the following is a specification.

This invention relates to improvements in machines for grading fruit and vegetables according to size, and generally has as its object to provide a machine of this class which will automatically, accurately and expeditiously grade the fruit or vegetables according to size without in any way bruising the same or injuring the tender skins thereof.

One of the primary objects of the invention is to provide means for automatically turning the fruit or vegetables as they are carried through the machine, in such manner that a more accurate grading will be effected than would be possible without the provision of such means. An objectionable feature common to a great many types of graders is that fruit or vegetables of elongated contour, such, for example, as pears and potatoes, will lodge upon the grading rails or equivalent elements in such position that they will extend in the direction of their longer axes transversely of the rails so that there is a liability of the smaller sizes of fruit or vegetables being carried along the rails or the like, while maintaining this position, and being deposited in the receptacles provided for the much larger sizes of fruit or vegetables. It is evident that a more accurate and uniform grading can be effected if the fruit or vegetables are graded or separated according to the lengths of their minor axes but, as stated, this result cannot be accomplished with certainty where no means is provided for causing the fruit or vegetables to assume such a position upon the grading rails that their major axes will be disposed vertically or parallel to the rails. To accomplish this result it has been proposed in some instances to provide abutments in the path of travel of the fruit or vegetables so that the fruit or the like will be turned upon coming into contact with the abutments. However, such an arrangement presents the disadvantage that through such contact the fruit or vegetables are liable to be bruised or their skins torn. Therefore as stated it is one of the primary objects of the invention to provide means whereby the fruit will be given a rotary motion while being carried along the grading rails, as a result of which motion imparted to them, they will be caused to assume a position in which their longer axes will be vertical or parallel to the rails, and the invention further has as its object to accomplish this result without any liability of bruising the fruit or vegetables or injuring their skins.

Another object of the invention is to provide at the head or receiving end of the machine, a novel means whereby the fruit deposited into the machine at this end will be caused to pass in front of workers and in its travel will be turned so as to expose all sides thereof, thus greatly facilitating the task of the workers which comprises picking out the culls and depositing the usable fruit or vegetables upon the grading rails. Incidentally it is an object of the invention to so construct this means that while it will effectually rotate or turn the fruit or vegetables in such a manner as to expose any blemishes or bruises thereon, there will be no likelihood of the usable fruit or vegetables being bruised or their skins injured because of the action of the turning and conveying means.

A further object of the invention is to provide novel means for disposing of the culls as they are separated from the more perfect fruit.

The invention has as a further object to provide means whereby the diverging grading rails may be relatively adjusted so that their angles of divergence may be readily increased or diminished as desired and depending, of course, upon the number of grades into which the fruit or vegetables are to be separated in accordance with size, or upon the kind of fruit or vegetables to be graded.

In the accompanying drawings:

Figure 1 is a view partly in top plan and partly in horizontal section illustrating the machine embodying the present invention;

Fig. 2 is a side elevation of the machine, parts being shown in section;

Fig. 3 is a vertical transverse sectional view taken substantially on the line 3—3 of Fig. 1;

Fig. 4 is a similar view taken substantially on the line 4—4 of Fig. 2 looking in the direction indicated by the arrows;

Fig. 5 is a similar view taken substantially on the line 5—5 of Fig. 2 looking in the direction indicated by the arrows;

Fig. 6 is a detail view partly in elevation and partly in section illustrating the conveying and turning means for the fruit located at the head end of the machine;

Fig. 7 is a detail vertical transverse sectional view through one of the grading rails of the machine;

Fig. 8 is a fragmentary top plan view of the structure shown in Fig. 7;

Fig. 9 is a fragmentary perspective view illustrating a portion of the means provided for disposing of the culls.

The component parts of the machine embodying the present invention are mounted in any suitable frame structure and as this frame structure itself does not enter into the present invention, it will not be specifically described, only such parts thereof as are necessary to an understanding of the invention being hereinafter referred to. A portion of the frame structure is indicated in general by the numeral 1 and arranged therein are a number of parallel transverse partitions 2 which form between them bins 3 into which the fruit or vegetables are permitted to drop as they fall between the grading rails of the machine. These bins 3 are closed at their outer ends by side boards 4, and preferably the lower edges of the partitions 2 are inclined downwardly in opposite directions from the central portion of each partition to the outer ends thereof as indicated by the numeral 5. The numeral 6 indicates the bottoms of the bins and these bottoms are in the nature of sheets of cloth or other soft, yielding and flexible material secured to the lower edges 5 of the said partitions 2 and suitably sagged to reduce to the minimum the liability of injury to the fruit or vegetables when they drop thereon in falling between the grading rails. As these flexible bottoms 6 are secured to the inclined lower edges of the partitions 2, the said bottoms will also be inclined downwardly in the direction of their outer ends so that the fruit or vegetables will first fall upon the upper portions of the bottoms and will then be permitted to roll down said bottoms to the lower portions thereof, they being removed from the respective bins into which they have been deposited, at suitable intervals. In the illustrated embodiment of the invention there are a considerable number of the bins 3 but it will be understood that the number of bins may be increased or decreased as found desirable without departing from the spirit of the invention, and depending chiefly, of course, upon the number of grades into which it is desired to separate the fruit or vegetables and also upon the character or kind of the fruit or vegetables to be separated or graded.

It is above the series of bins 3 above described that the diverging grading rails are arranged to extend and these rails are indicated in the drawings in general by the numeral 7. Any desired number of the rails 7 may be employed, there being in the present instance five such rails. In order that the rails may be firmly supported in position and furthermore in order that they may be relatively adjusted so as to increase or decrease the distance between adjacent rails or decrease the angle of divergence of adjacent rails, means is provided which will now be described. Certain of the partitions 2 are recessed or grooved in their upper edges as indicated by the numeral 8, and upon the upper edge of each of such partitions and extending over the recess or groove therein there is disposed a plate 9 formed with a longitudinally extending slot 10 opening into the respective recess or groove 8. A bolt 11 provided at one end with a head 12, is fitted through the slot 10 and through an opening 13 formed vertically in the respective rail 7, the head 12 of the bolt bearing against the under side of the said plate 9. The upper end of the bolt is threaded as indicated by the numeral 14 and extends upwardly within a recess 15 formed in the upper edge of the said respective rail 7, and a washer 16 and nut 17 are fitted onto the said end of the bolt, the washer 16 resting upon the bottom wall of the recess 15 and the nut 17 bearing against the washer so that when the said nut is tightened the rail 7 will be clamped firmly at its lower edge against the upper face of the plate 9. Of course, when all of the bolts, provided for securing each of the rails, are tightened, the respective rails will be securely held in place and on the other hand by loosening the nuts 17, the rails 7 may be shifted laterally due to the engagement of the lower end portions of the bolts 11 through the slots 10 in the said plates 9. While the nuts 17 are received within the recesses 15, they project a sufficient distance above the upper edges of the respective rails 7 to permit of the application thereto of a wrench for tightening or loosening them. Of course, in shifting the rails laterally after the nuts 17 have been loosened, the relative angular disposition of adjacent rails may be varied as conditions warrant as also the spaces between the rails. The rails 7 are designed to serve as supports for the traveling upper stretches of endless cables which are designed to conduct along the rails the fruit or vegetables to be graded, each of the intermediate rails supporting two of these cables and each of the outer rails supporting a single one of the cables. As a general proposition each rail is provided, at the side or sides of its upper edge which are located opposite another rail, with means for supporting such a cable or more specifically the traveling upper stretch thereof. For example the rail shown in Figs. 7 and 8 of the drawings, being one of the intermediate rails, is provided at both sides of its upper edge with means for supporting the traveling upper stretch of the cable. In providing for the support of the said traveling upper stretches of the cables, the upper edge of the rail is rabbeted at the side as indicated by the numeral 18, and seated and secured within this rabbet is a guide 19 having a transversely arcuate channel 20 opening upwardly and outwardly and of a curvature and dimensions to more or less accurately receive the lower and inner side of the stretch of the cable to be supported. While various kinds of cables might be employed for the purpose, I prefer to make use of a cable of the general construction shown in Figs. 7 and 8, the same comprising a core 21 and a spiral wrapping 22, the latter being of less diameter than the core 21 and thus serving as a means for increasing the diameter of the cable to maximum without at the same time rendering the cable so stiff and inflexible as to interfere with its being properly driven. The guides 19 extend the entire lengths of the respective rails 7 and consequently the upper stretches of the cables are supported throughout their entire lengths. Therefore the fruit or vegetables to be graded are given the required firm support and yet due to the even motion or travel of the said upper stretches of the cables and their relatively large diameter, there is minimum likelihood of bruising of or other injury to the fruit or vegetables.

In order to provide for travel of the cables above described, a shaft 23 is fixed in suitable brackets 24 and mounted upon the shaft are idle pulleys 25 over which the cables are passed as clearly shown in Figs. 1 and 2 of the drawings. From the idle pulleys 25, the cables pass about other pulleys 26 and 27 fixed upon a shaft 28 mounted in suitable bearings 29 at the said end of the frame below the shaft 23. From the pulleys 26 and 27, the cables pass to the head end of the machine and about pulleys 30 mounted upon a shaft 31 suitably mounted at the said end of the frame. The lower stretches of the cables, as clearly shown in Fig. 2 of the drawings, pass beneath the bins 3, whereas their upper stretches pass along the respective guides 18 as heretofore stated.

The moving parts of the machine are adapted to be driven in any suitable manner as for example by an electric or other suitable motor 32 mounted preferably within the section 1 of the frame at the foot end thereof, a pulley 33 being fixed upon the shaft of this motor and transmitting motion to a belt 34 which passes about the said pulley and also about a larger pulley 35 fixed upon a shaft 36 mounted in the frame. A smaller pulley 37 is also fixed upon the shaft 36 and a belt 38 is passed about the said pulley 37 and about a larger pulley 39 fixed upon the shaft 28. In this manner motion is transmitted to the said shaft 28 and consequently to the cables which are trained about the pulleys 26 and 27 upon the said shaft. The pulleys 26 and 27 are of different diameters, the pulleys 26 for example being of smaller diameter than the pulleys 27. As a matter of convenience the cables are severally indicated in the drawings by the reference letters $a$, $b$, $c$, $d$, $e$, $f$, $g$ and $h$ and in practice the cables $b$, $c$, $f$ and $g$ will for example be trained about the larger pulleys 27 whereas the cables $a$, $d$, $e$ and $h$ will be trained about the smaller pulleys 26. In the operation of the machine the fruit or vegetables to be graded will be carried along by the cables as the cables travel from the head end to the foot end of the machine, the fruit being supported upon the adjacent cables of adjacent rails until the space between the cables supporting each particular fruit or vegetable is equal to or slightly greater than the diameter of the fruit or vegetable at its engaged points whereupon the fruit or vegetable will drop from between the rails into the bin which is immediately beneath it at that moment. Thus in effect in the illustrated embodiment of the invention there are four pairs of the cables, and due to the difference in diameter of the pulleys 26 and 27 and the arrangement of these pulleys, one cable of each pair as for example the cable $b$ of the pair comprising the cables $a$ and $b$ will travel at a greater rate of speed than its companion cable, in this instance the cable $a$. Consequently, the fruit or vegetables will be given a spinning or rotary motion as they are carried along and therefore before they have been carried any considerable distance, they will have been turned to such position that their major axes will extend vertically or substantially vertically or more or less horizontally and parallel or substantially parallel to the respective rails or the cable stretches upon which they are supported. Of course, both cables of each pair coact to carry the fruit or vegetable along the grading rails but one of these cables, by traveling at a greater rate of speed than the other serves the additional purpose of a means for imparting rotary or spinning motion to the fruit or vegetable as it is carried along.

In order that rotary motion may be imparted to the shaft 31 and power taken from this shaft to operate other portions of the machine as will be presently explained, the pulleys 30 over which either the fast or the slow moving cables pass are fixed to the said shaft, the other pulleys running idle. Upon the shaft 31 are fixed pulleys 40 over which are passed belts 41, the pulleys 40 being preferably located at the opposite ends of the series of pulleys 30. The lower stretches of the belts 41 pass beneath idle pulleys 42 mounted in the frame of the machine at the head end thereof, this portion of the frame being indicated in general by the numeral 43, and from these pulleys the belts 41 are led to and trained about pulleys 44 fixed upon shafts 45 mounted in the section 43 of the frame. The numeral 46 indicates small idle pulleys which are to coact with the upper stretches of the respective belts 41 and each of these idle pulleys is mounted rotatably at the upper end of an arm 47 pivotally connected at its lower end as at 48 with a foot lever 49, the latter being in turn pivotally mounted as at 50 at the respective side of the frame and being provided with any suitable number of foot treadles 51 whereby the sorters standing at either side of the frame section 43 may swing the foot lever 49 downwardly so as to cause the idle pulley 46 to pull downwardly upon the upper stretch of the respective belt 41 for the purpose of setting in motion the respective shaft 45. The arm 47 is supported in upright position by means of a rocking link 52 mounted in the frame section 43 and pivotally connected with the respective arm. It will be understood that two of the foot levers 49 are provided, one located at each side of the frame section 43 and that these levers are to be independently operated by the sorters at the opposite sides of the machine so that either of the two belts 41 may be tightened or permitted to remain idle as desired or found necessary by the respective group of sorters, and independently of the other belt. Also fixed upon the shafts 45, and upon corresponding shafts 53 mounted in the frame section 43 are sprocket drums indicated by the numerals 54 and 55 respectively. Trained about each set of drums 54 and 55 is an endless chain of rolls indicated in general by the numeral 56, there being, as a result of this arrangement, one chain of rolls at each side of the head section of the machine and the arrangement being such that the upper stretches of the rolls will travel in a horizontal plane immediately below the plane occupied by the head ends of the grading rails 7. These rolls are most clearly illustrated in Figs. 1, 2, 4, 5 and 6 of the drawings, they being shown in detail in the last mentioned figure. Each roll comprises a body 57 which is cylindrical except that at suitable intervals in its circumference it is formed with longitudinally extending concave grooves 58 which are, however, relatively shallow as shown in the said figure. The rolls 57 are connected in a chain or series by means of sprocket links 59 connected at their ends pivotally with small trunnions 60 at the opposite ends of the rolls, the rolls being thus mounted for independent rotation as well as for travel longitudinally of the respective sides of the machine in which they are located. In order to provide for automatic rotation of the rolls as they travel at the upper stretch of the chain or series, a series of transverse slats 61 constituting a rack, are arranged beneath the upper stretch of each chain in such position and so spaced that as the rolls comprising the upper stretches of the respective chains pass above the slats, their grooves 58 will be caused to register or mesh with the upper sides of the said slats which are transversely rounded as indicated by the numeral 62 to correspond approximately to the curvature of the walls of the said grooves. As a consequence as each roll passes over one of the slats 61 the wall of its groove will ride over the upper face 62 of the said slat and the roll will be rotated a part of a complete revolution depending, of course, upon the spacing of the slats and the number of grooves provided in the rolls. For example, in the present instance each roll is provided with four of the grooves and consequently as each roll passes over one of the slats it will be rotated a quarter of a revolution and as it passes over the next slat in order it will be rotated through another quarter of a revolution.

By reference to Figs. 1, 4 and 5 of the drawings it will be observed that at the head end of the machine the sorting rails are extended to lie relatively close together, these rails occupying the central portion of the head end of the frame of the machine at the top thereof, and the upper stretches of the roll chains 56 being located at the opposite sides of the series of rails. It will now be evident that inasmuch as the upper stretches of the roll chains pass in front of the sorters standing at the opposite sides of the head end of the machine, fruit or vegetables deposited upon the said stretches of the chains will be carried along in front of the sorters and as they are carried along will be given a turning motion so as to disclose to view any blemishes, thus enabling the sorters to readily separate the culls and pick up and place the usable fruit or vegetables onto the grading rails whereupon they will be carried in the direction of the foot end of the machine and automatically graded as to size. Of course, the presence of the grooves 58 in the circumferential surfaces of the rolls 56 adds greatly to the effectiveness of the rolls in imparting turning motion to the fruit or vegetables.

In order that the fruit or vegetables to be sorted may be promiscuously dumped into the machine and automatically fed onto the roll chains 56, a table is provided at the extreme head end of the machine at the top of the frame section 43 and comprises a bottom 63 which is inclined downwardly at a gradual angle in the direction of the roll chains and near its discharge end is divided to provide more steeply inclined portions 64 each arranged to discharge upon the upper stretch of the respective chain of rolls. In order to more or less equally divide the mass of fruit or vegetables deposited upon the table, the table is provided at its longitudinal center with a ridge indicated by the numeral 65 having sides 66 which slope downwardly in opposite directions and are of increasing height as they approach the lower side of the inclined table top 63.

In some localities apples and other fruit will average a high percentage of what is known as "fancy grade" and under these conditions the work of sorting may be greatly simplified and expedited if the sorters are required to only pick out from the load discharged into the sorting machine, the culls and the fruit of an inferior grade. In order that this may be accomplished it is preferable that the conveyer roll chains 56 be so arranged that their upper stretches will occupy a plane above the upper side of the rails 7 and the cables which travel upon the rails, inclined chutes or runways 67 being arranged at the forward ends of the two chains and being inclined in a manner to discharge onto the adjacent outer pairs of cables. By reason of this arrangement the sorters are not required to pick up from the roll conveyer chains fruit which is obviously of a fancy grade but may allow this fruit to be carried along by the chains and discharged into the chutes or runways 67 from which it will be discharged onto the said adjacent outer pairs of cables 22. Thus fruit of a fancy grade is automatically disposed of by the machine and considerable time and labor is saved.

In order to provide for the carrying off and discharge of the culls from the machine in an automatic manner after the culls have been separated from the fruit of better grades by the sorters means is provided which will now be described. The numeral 68 indicates in general a trough which is arranged within the rear section of the frame above the rear ends of the grading rails 7 to extend longitudinally of the said portion of the frame, as clearly shown in Fig. 2 of the drawings. This trough comprises sides 69 and a bottom 70, and the said bottom 70 has a flat or horizontally disposed intermediate portion 71 and inclined side portions 72 so that fruit disposed within the trough will be directed through gravity toward the horizontal intermediate portion 71. The lower stretch of a belt 73 travels over this portion of the said bottom and the belt is passed about pulleys 74 journaled upon shafts 75 in the said rear portion of the frame of the machine, one of the shafts 75 being driven by a suitable belt and pulley connection 76 from the shaft 31.

At its rear end the trough 68 is arranged to discharge laterally into a discharge chute 77 which is inclined downwardly and rearwardly and may discharge into baskets or other receptacles provided to receive the culls. In order to direct the fruit laterally from the lower stretch of the belt 73 and into the chute 77, a deflector plate 78 is arranged within the rear end of the trough and is positioned to extend diagonally of the said lower stretch of the belt, as clearly shown in Fig. 9 of the drawings. It will now be evident that when the culls are placed within the trough by the sorters they will be carried along by the lower stretch of the belt 73 until they strike the deflector plate 78 whereupon they will be deflected laterally and discharged from the belt into the upper end of the chute 77.

Having thus described the invention, what is claimed as new is:

1. In a machine of the class described, sorting mechanism including an endless series of rolls, means for imparting travel to the series, and spaced elements arranged in the path of movement of the upper stretch of the series for coaction with the rolls to individually rotate the same.

2. In a machine of the class described, sorting mechanism including an endless series of rolls, means for imparting travel to the series, the rolls having longitudinal grooves in their circumferential surfaces, and a series of slats arranged in the path of travel of one stretch of the series and constituting means engageable in the said grooves for imparting individual rotary motion to the rolls as the rolls pass along the said series of slats.

3. In a machine of the class described, spaced diverging grading members, flexible carrying elements traveling along the said members, and sorting mechanism including an endless series of rolls mounted for travel at one side of the said spaced diverging grading members, gears about which the series of rolls is trained, a pulley rotatable with one of said gear elements, a drive belt passing about the pulley, a lever member, an arm connected with the lever member, and an idler carried by the arm and engaging one stretch of the belt and constituting means whereby the belt may be tightened through operation of the said lever member.

4. In a machine of the class described, an assemblage of grading members diverging from one end to the other, sorting mechanisms arranged at the opposite sides of the said assemblage at the first mentioned end thereof and each of said mechanisms comprising an endless series of rolls and means for imparting travel thereto, and a receiving table having an inclined surface for separating the fruit or the like deposited thereon and guiding the separated portions thereof onto the respective roll series.

5. In a machine of the class described, grading means, and sorting mechanism including means for individually selectively moving said sorting mechanism, such mechanism being on either side of said grading means whereby the operators removing selected fruit or the like may place the same on the grading means.

6. In a machine of the class described, grading means, sorting mechanism on either side of said grading means and selectively movable at the instance of the operator whereby the operators selecting fruit or the like may place the same on the grading means.

7. In a machine of the class described, grading means, sorting mechanism on either side thereof including selectively operable means for moving said sorting mechanism, and means beneath the grading means for collecting selectively graded fruit.

8. In a machine of the class described, grading means, optionally movable sorting means selectively operable on either side of the grading means, and means beneath the grading means for collecting selectively graded fruit.

9. In a machine of the class described, grading means comprising diverging longitudinally disposed members moving at different speeds to rotate the articles to be graded, and sorting means on either side thereof comprising a roller chain and including means for rotating the individual rollers to turn the articles to be sorted.

In testimony whereof I affix my signature.

MILTON W. BIRD. [L. S.]